(12) United States Patent
Decoodt et al.

(10) Patent No.: US 9,295,985 B2
(45) Date of Patent: Mar. 29, 2016

(54) CONTINUOUS CATALYST REGENERATION REACTOR WITH A CHAMBER FOR MIXING GAS AND DISTRIBUTING GAS IN THE OXYCHLORINATION ZONE

(71) Applicant: AXENS, Rueil Malmaison (FR)

(72) Inventors: Xavier Decoodt, Carrieres S/Seine (FR); Cecile Plais, Les Haies (FR); Frederic Bazer-Bachi, Irigny (FR)

(73) Assignee: AXENS, Rueil-Malmaison (FR)

(*) Notice: Subject to any disclaimer, the term of this patent is extended or adjusted under 35 U.S.C. 154(b) by 301 days.

(21) Appl. No.: 13/949,340

(22) Filed: Jul. 24, 2013

(65) Prior Publication Data

US 2014/0027348 A1      Jan. 30, 2014

(30) Foreign Application Priority Data

Jul. 25, 2012   (FR) ...................................... 12 02110

(51) Int. Cl.
| | | |
|---|---|---|
| *B01J 38/44* | (2006.01) | |
| *B01J 23/96* | (2006.01) | |
| *C10G 35/24* | (2006.01) | |
| *B01J 8/12* | (2006.01) | |
| *B01J 23/42* | (2006.01) | |
| *B01J 27/13* | (2006.01) | |
| *B01J 27/32* | (2006.01) | |
| *C10G 35/12* | (2006.01) | |
| *B01J 27/135* | (2006.01) | |

(52) U.S. Cl.
CPC   *B01J 38/44* (2013.01); *B01J 8/125* (2013.01); *B01J 23/42* (2013.01); *B01J 23/96* (2013.01); *B01J 27/13* (2013.01); *B01J 27/32* (2013.01); *C10G 35/12* (2013.01); *B01J 27/135* (2013.01); *B01J 2219/00024* (2013.01); *C10G 2400/02* (2013.01); *Y10T 29/4973* (2015.01)

(58) Field of Classification Search
CPC .. B01J 2219/00024; B01J 23/96; B01J 38/44; B01J 38/04; B01J 38/12; B01J 8/085; B01J 8/125; C10G 2400/02; C10G 35/085; C10G 35/12
See application file for complete search history.

(56) References Cited

U.S. PATENT DOCUMENTS

| | | |
|---|---|---|
| 3,132,092 A | 5/1964 | Vaell |
| 6,103,652 A | 8/2000 | Brunet et al. |
| 7,985,381 B2 | 7/2011 | Sun et al. |

FOREIGN PATENT DOCUMENTS

EP    0872277 A1    10/1998

OTHER PUBLICATIONS

Search Report for FR 1202110 (Mar. 11, 2013).

*Primary Examiner* — Renee E Robinson
*Assistant Examiner* — Derek Mueller
(74) *Attorney, Agent, or Firm* — Millen, Whie, Zelano, Branigan, P.C.

(57) ABSTRACT

A reactor for regenerating catalyst grains comprises a vessel having an oxychlorination zone superimposed over a calcining zone having a line for introducing gas. A chamber, disposed between oxychlorination and calcining zones, comprises an internal space located between two plates which are gas tight and impervious to catalyst grains. A plurality of tubes pass through the chamber to allow catalyst to pass from oxychlorination zone to calcining zone. A plurality of means pass through the chamber to allow calcining gas to pass from calcining zone to oxychlorination zone. At least one oxychlorination gas injection line opens into the internal space of the chamber. Each means for passage of calcining gas comprises at least one orifice communicating with the chamber internal space, and a means for evacuating gas which is permeable to gas and impermeable to catalyst grains.

17 Claims, 3 Drawing Sheets

CONTINUOUS CATALYST REGENERATION REACTOR WITH A CHAMBER FOR MIXING GAS AND DISTRIBUTING GAS IN THE OXYCHLORINATION ZONE

The present invention relates to the field of hydrocarbon conversion, and more specifically to reforming hydrocarbon feeds in the presence of a catalyst in moving bed mode in order to produce gasoline cuts. The present invention proposes a catalyst regeneration reactor with a chamber in which gas passages are disposed in order to mix the calcining and oxychlorination gases and to distribute the resulting gas in the catalyst oxychlorination zone.

Processes for the catalytic reforming of gasolines functioning in moving bed mode generally employ a reaction zone which can comprise three or four reactors in series and a catalyst regeneration zone which implements a certain number of steps, in general a combustion step, then an oxychlorination step, followed by a calcining step and a reduction step. The document U.S. Pat. No. 3,761,390 describes an example of a catalytic reforming process functioning in moving bed mode.

The document U.S. Pat. No. 7,985,381 describes, in detail, a regeneration reactor comprising a combustion zone, an oxychlorination zone and a calcining zone. The catalyst moves in the reactor in a vertical downwards direction. It passes from the oxychlorination zone to the calcining zone via an annular ring. A calcining gas injected into the bottom of the calcining zone passes through the bed of catalyst in the calcining zone as a counter-current and then is recovered in a second annular zone located at the periphery of the reactor. In that second annular zone, the oxychlorination gas is injected in order to be mixed with the calcining gas which has been recovered. The gas mixture is then injected at the periphery of the reactor into the bottom of the oxychlorination zone.

The disadvantage of injecting this mixture of gas at the periphery of the reactor is that it generates a gas velocity profile which is not homogeneous at the outlet from the injection zone over the section of the oxychlorination zone. In addition, the passage for the catalyst from the oxychlorination zone to the calcining zone via an annular ring in the reactor is bulky and generates pressure drops. However, the pressure drops are not sufficient to prevent the calcining gas from rising directly via the catalyst droplegs without passing into the outer annular ring and thus without being mixed with the calcining gas.

The present invention proposes optimizing the distribution of the gas mixture injected into the oxychlorination zone via a chamber which in particular can be used to optimize the gas mixture and distribute the gas mixture in a homogeneous manner over the section of the reactor.

In general, the present invention concerns a reactor for continuously regenerating grains of catalyst, composed of a vessel comprising an oxychlorination zone superimposed over a calcining zone provided with a line for introducing calcining gas, characterized in that a chamber is disposed between the oxychlorination zone and the calcining zone, the chamber being composed of an internal space located between two plates which are gas tight and impervious to grains of catalyst, a plurality of tubes passing through the chamber to allow grains of catalyst to pass from the oxychlorination zone to the calcining zone, a plurality of means passing through the chamber to allow calcining gas to pass from the calcining zone to the oxychlorination zone, the reactor comprising at least one oxychlorination gas injection line opening into the internal space of the chamber, each means for the passage of gas comprising at least one orifice communicating with the internal space of the chamber, each means for the passage of gas comprising a means for evacuating gas in the oxychlorination zone, the gas evacuation means being permeable to gas and impermeable to grains of catalyst.

In accordance with the invention, each gas evacuation means may be selected from a bubble cap, a perforated plate and a screen.

As an example, each gas evacuation means is composed of a vertical tubular screen, the lower end of the tubular screen communicating with the mixing zone, the upper end of the screen being obstructed by a roof. The roof may be a cone the peak of which is directed upwardly.

The oxychlorination gas injection line may open at the centre of the internal space of the chamber. Alternatively, the oxychlorination gas injection line may open into the internal space of the chamber at the wall of the reactor vessel.

The orifice may be pierced in an upwardly orientated direction, forming an angle in the range 0° to 80° with respect to a horizontal direction, preferably in the range 0° to 60° with respect to a horizontal direction.

At least a portion of the tubes and the gas passage means may be integral with the two plates.

The invention also concerns the use of a reactor in accordance with the invention in a process for catalytic reforming of a hydrocarbon feed, in which:
- a stream of grains of catalyst is introduced at the head of the oxychlorination zone;
- a stream of calcining gas is introduced via the calcining gas introduction line;
- a stream of oxychlorination gas is introduced via the oxychlorination gas injection line;
- a stream of gas is evacuated from the head of the oxychlorination zone;
- a stream of grains of catalyst is evacuated from the bottom of the calcining zone.

The grains of catalyst may comprise platinum deposited on a porous support, the stream of calcining gas may comprise air or oxygen-depleted air and may be at a temperature in the range 400° C. to 550° C., the flow of oxychlorination gas may comprise a chlorinated compound and may be at a temperature in the range 350° C. to 550° C.

In accordance with the invention, an existing reactor may be remodelled by replacing the old oxychlorination gas injection system with said mixing zone.

In accordance with the invention, the mixing the calcining gas with the oxychlorination gas in the chamber which is free of catalyst grains means that good mixing of the gas can be obtained.

In addition, multiplication of the points for injecting gas via the orifices over the reactor section means that the distribution of the gas mixture over the whole of the reactor section is excellent directly from the chamber outlet.

Furthermore, the chamber used in accordance with the invention has the advantage of being compact and of ensuring excellent mechanical behaviour due to its structure.

Further, the passage of grains of catalyst from the oxychlorination zone to the calcining zone via tubes means that the passage of gas directly from the calcining zone to the oxychlorination zone without passing via the mixing zones of the chamber can be minimized due to the small available cross section of flow for the gas.

Further, the present invention can easily be carried out in existing facilities. In particular, the present invention can advantageously replace an oxychlorination gas injection device with a view to improving the mixing and distribution performances.

Other characteristics and advantages of the invention will be better understood and will become apparent from the following description made with reference to the drawings, in which:

BRIEF DESCRIPTION OF THE DRAWINGS

In FIG. 1, the catalyst regeneration reactor is composed of a vessel 2 encompassing a combustion zone CO, an oxychlorination zone O and a calcining zone CA. The vessel 2 may be in the form of a cylinder with a vertical axis, the cylinder being closed at its ends. The combustion, oxychlorination and calcining zones are superimposed in the reactor 1. In the reactor 1, these zones may be of the same diameter or have different diameters.

The catalyst to be regenerated is introduced at the head of the reactor 1 via a line or lines 3 and is evacuated from the reactor 1 via lines located at the bottom of the reactor 1. The catalyst moves from top to bottom in the reactor under gravity, passing in succession through the combustion zone CO, oxychlorination zone O and calcining zone CA. The catalyst is evacuated from the reactor 1 at the bottom of the calcining zone CA via the lines 4. The reactor 1 is continuously supplied with catalyst and the catalyst moves continuously in the reactor 1.

The catalyst is in the form of a solid grain, for example in the form of a bead 0.5 to 20 mm in diameter, in order to facilitate movement of the catalyst in the reactor 1. The grains of catalyst are composed of a porous support, for example an alumina, on which various compounds are deposited, in particular platinum and chlorine, and optionally tin, rhenium, indium and/or phosphorus. The catalyst to be regenerated comprises coke, for example approximately 5% by weight of coke.

The catalyst introduced into the reactor 1 via the line 3 arrives in a reservoir 5 provided with a hopper in order to supply the combustion zone CO with catalyst.

Figure 1:
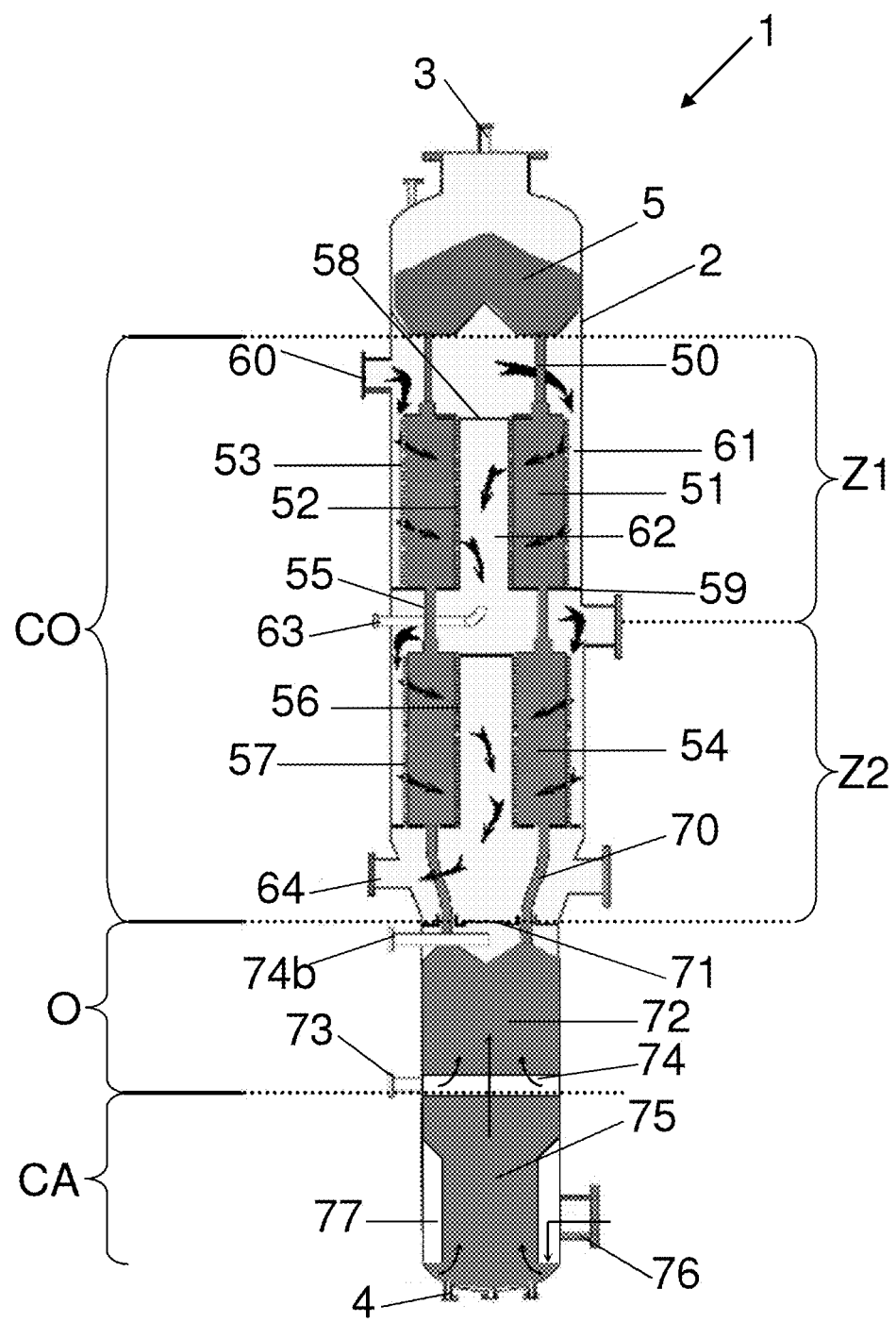
FIG. 1 represents a catalyst regeneration reactor.

The combustion zone CO is intended to carry out combustion of coke deposited on the catalyst. The zone CO may comprise one or more stages. The reactor 1 of FIG. 1 comprises two stages Z1 and Z2. In accordance with a particular embodiment, the combustion zone may also comprise a combustion control zone, for example such as that described in document FR 2 761 907. The catalyst of the reservoir 5 is introduced into an annular space 51 of the stage Z1 via supply lines 50. The annular space 51 is defined by two tubular screens 52 and 53, for example cylindrical and concentric. The space 61 located between the tubular screen 53 and the vessel 2 is closed off at its lower end by the plate 59. The space 61 may be arranged in the shape of a portion which is routinely known as a scallop section. The central space 62 located inside the tubular screen 52 is closed off at its upper end by the plate 58. The catalyst from the annular space 51 is introduced into an annular space 54 of the stage Z2 via supply lines 55. The space 54 is defined by two tubular screens 56 and 57, for example cylindrical and concentric. The screens 52, 53, 56 and 57 can be used to retain the catalyst while allowing gas to pass through. As an example, the screens 52, 53, 56 and 57 may be Johnson screens and/or perforated plates.

A first combustion gas stream containing oxygen is introduced into the vessel 2 at the head of the stage Z1 via the orifice 60. In the stage Z1, the gas stream moves in the direction of the arrows indicated in FIG. 1, passing through the bed of catalyst contained in the annular space 51. In fact, the impervious plates 58 and 59 force the combustion gas supplied via the orifice 60 to pass from the space 61 at the periphery of the annular space 51 to the central space side 62 located inside the screen 52, passing through the catalyst in the annular space 51. A second stream of combustion gas containing oxygen is introduced between the stage Z1 and Z2 via the line 63. This second stream mixes with the first flow of gas that has passed through stage Z1. In the same manner as for the stage Z2, the combustion gas passes through the bed of catalyst contained in the annular space 54 in the direction of the arrows indicated in FIG. 1. After having passed through the catalyst of the zone 54, the combustion gas is evacuated from the stage Z2 via the line 64.

In accordance with another embodiment, the combustion zone CO may be arranged such that the combustion gas moves from the inside to the outside in the annular spaces 51 and 54. In addition, alternatively, in accordance with another embodiment, the combustion zone may be arranged such that the gas flow is injected at the bottom of the zone CO and evacuated from the head of the zone CO.

The catalyst in the annular zone 54 of the combustion zone flows from the combustion zone CO into the oxychlorination zone O via the lines 70. The plate 71 disposed between the combustion zone and the oxychlorination zone O is gas-tight in order to prevent gas from moving between these two zones.

In particular, the oxychlorination zone O is aimed at recharging the grains of catalyst with chlorine and at re-dispersing platinum at its surface in order to improve the distribution of platinum in the grains of catalyst. In the oxychlorination zone O, the catalyst flows in the internal space 72 of the reactor, for example the cylindrical space defined by the walls of the vessel 2 of the reactor. The bottom of the space 72 of the oxychlorination zone O is provided with a line 73 which can be used to inject oxychlorination gas into the oxychlorination zone. The oxychlorination gas comprises a chlorine-containing compound and may be at a temperature in the range 350° C. to 550° C., preferably in the range 460° C. to 530° C. At the head of the space 72, the line 74*b* can be used to evacuate gas from the oxychlorination zone O. The oxychlorination gas injected via the line 73 moves in an upwards direction through the space 72, as a counter-current to the gravitational flow of the catalyst. Next, the gas which has passed through the space 72 is evacuated from the vessel 2 via the line 74*b*.

The catalyst arriving at the bottom of the oxychlorination zone O continues to flow from the space 72 to the space 75 of the calcining zone CA. The particular aim of the calcining zone is to dry the catalyst grains. The bottom of the calcining zone CA is provided with a line 76 which can be used to inject calcining gas at the bottom of the space 75. The calcining gas comprises air or air which is depleted in oxygen and may be at a temperature in the range 400° C. to 550° C. In order to distribute the calcining gas in a homogeneous manner in the space 75, the line 76 may open into an annular space 77 disposed at the periphery between the space 75 and the vessel 2. The annular space 77 is open at its lower portion located at the bottom of the space 75 of the calcining zone CA. Thus, the gas injected via the line 76 is distributed in the bed of catalyst over the whole of the periphery at the bottom of the space 75. The calcining gas injected via the line 76 moves in an upwards direction, as a counter-current to the gravitational flow of catalyst through the space 75, then through the space 72.

When the calcined gas passes from the space 75 to the space 72, it encounters and mixes with oxychlorination gas injected via the line 73. Next, the gas which has passed through the space 72 is evacuated from the vessel 72 via the line 74b.

In accordance with the invention, a mixing zone 74 is disposed between the space 72 and the space 75. The mixing zone 74 comprises a chamber which is designed so as to homogeneously mix the calcining gas with the oxychlorination gas and to distribute the gas mixture over the whole of the section of the space 72 in a homogeneous manner.

The mixing zone 74 is described in detail with reference to FIGS. 2 and 3. The reference numerals in FIGS. 2 and 3 which are identical to those of FIG. 1 denote the same elements.

Figure 2:
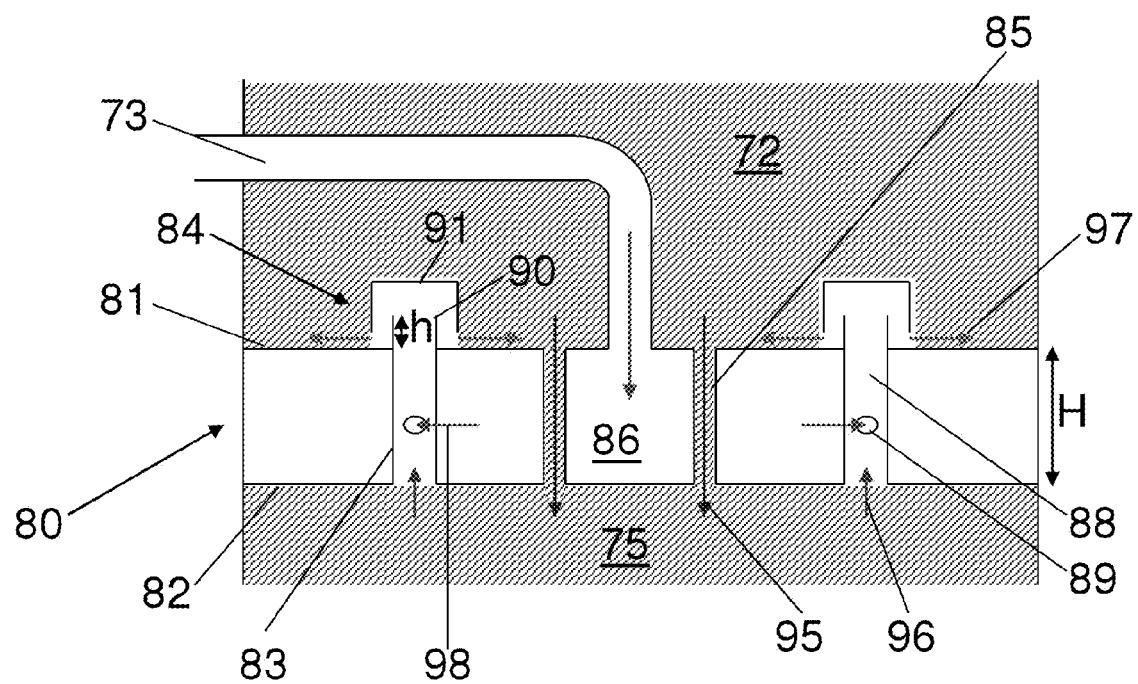
FIG. 2 represents an embodiment of a chamber of the invention.
Figure 3:
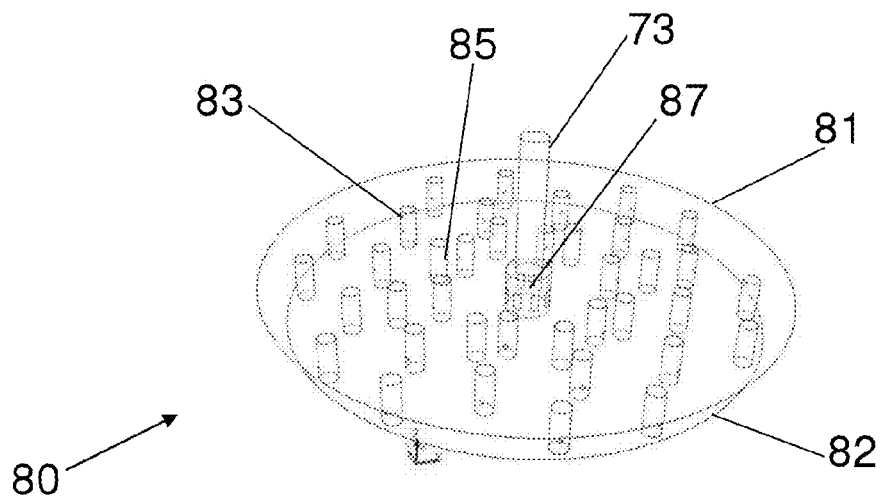
FIG. 3 represents a perspective view of the chamber shown diagrammatically in FIG. 2.

Referring to FIGS. 2 and 3, the mixing zone is composed of a chamber 80 positioned between the space 72 of the oxychlorination zone and the space 75 of the calcining zone. The chamber 80 extends over the whole section of the vessel 2, in a substantially horizontal plane. The chamber 80 is composed of two plates 81 and 82, which are preferably horizontal and which each extend over the section of the vessel 2. The two plates are spaced apart by a height H in order to form an internal space 86. The height H may vary between 50 mm and 500 mm. Each of the plates 81 and 82 is a plate which is gas tight and does not allow grains of catalyst to pass through. As an example, the plates 81 and 82 are each a solid disc with a section equal to the internal section of the vessel 2. The plates 81 and 82 may have different sections. Alternatively, the plate 81 may be corrugated, for example forming cones or funnels around the tubes 85 which are described below.

A plurality of tubes 85 pass through the chamber 80 to allow the flow of grains of catalyst from the space 72 of the oxychlorination zone to the space 75 of the calcining zone. The tubes 85 extend from the plate 81 to the plate 82 over a height H. The number, the position, the section and/or the height H of the tubes 85 are determined so as to ensure the passage of a stream of catalyst from the space 72 to the space 75. As an example, the cumulative section of tubes 85 is preferably greater than or equal to the section of the lines 4 for emptying the catalyst at the bottom of the reactor 1, the sections being measured in horizontal cross-section. The tubes 85 may be substantially vertical. As an example, the axes of the tubes 85 form an angle in the range 0 to 30° with respect to the vertical direction. As an example, the tubes 85 may be cylindrical tubes with a diameter in the range 1" (25.4 mm) to 4" (101.6 mm) and with a height H in the range 50 mm to 500 mm. Passage of the grains of catalyst from the oxychlorination zone to the calcining zone via the tubes 85, the cumulative section of which is relatively small, means that the direct passage of gas through these tubes 85 can be minimized. The dimensional parameters of the tubes 85 may, in addition, be determined in order to minimize the quantity of calcining gas rising from the space 75 towards the space 72 through the tubes 85. To this end, the total number of tubes may be in the range 1 to 20, preferably in the range 4 to 20, or preferably in the range 4 to 16, the minimum tube diameter being determined in order to prevent the grains of catalyst from blocking the tubes. Further, the ratio between the cumulative section of the tubes 85 and the surface area of the plate 81 may be in the range 0.1% to 5%, preferably in the range 0.5% to 2%, the cumulative section and the surface area of the plate 81 being measured in a horizontal plane.

In addition, gas passage means 83 pass through the chamber in order to ensure the movement of calcining gas from the space 75 of the calcining zone to the space 72 of the oxychlorination zone. The gas passage means 83 may be composed of a plurality of tubes extending from the plate 82 to the plate 81 over the height H. The number, the position, the section and/or the height H of the tubes 83 are determined in order to ensure that a flow of calcining gas passes from the space 75 to the space 72. The tubes 83 may be substantially vertical. As an example, the axes of the tubes 83 form an angle in the range 0 to 30° with respect to the vertical direction. As an example, the tubes 83 may be cylindrical tubes with a diameter in the range 0.5" (12.7 mm) to 4" (101.6 mm) and height H in the range 50 mm to 500 mm, preferably in the range 100 mm to 400 mm.

The mechanical behaviour of the plate 80 may be reinforced by attaching at least a portion of the tubes 85 and 83 on the one hand to the plate 81 and on the other hand to the plate 82.

The upper portion of the gas passage means 83 comprises a means for evacuation of gas 84 in order to distribute the gas in the space 72 of the oxychlorination zone. The dimensions of the orifices are such that they allow the passage of gas while preventing the passage of grains of catalyst. The gas evacuation means 84, and thus the gas passage means 83, are distributed over the surface of the plate 81, for example in a uniform manner, and allow the gas mixture to be distributed in a uniform manner over the section of the space 72 of the oxychlorination zone. Multiplying the gas injection points by the means 84 over the section of the reactor means that the gas mixture distribution over the whole section of the reactor is excellent, which distribution can be more rapid than when using an external ring such as that present in the document U.S. Pat. No. 7,985,381. As an example, the gas evacuation means 84 may be disposed such that the distance separating two means 84 is in the range 50 to 400 mm, preferably in the range 100 to 300 mm. Clearly, the gas passage means 83 associated with the gas evacuation means 84 are positioned on the plate 81 at locations which are different from the tubes 85.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 12/02.110, filed Jul. 25, 2012, are incorporated by reference herein.

As an example, the gas evacuation means 84 may be composed of a screen, a device which is routinely known as a bubble cap, or any other system that allows gas but not grains of catalyst to pass.

As an example, means for the evacuation of gas 84 of the bubble cap type shown diagrammatically in FIG. 2 may be used. The bubble cap orifice is composed of a vertical chimney 90 covered by a cap 91. The chimney 90 is a tube passing through the plate 81 and extending above the plate 81. The cap 91 may be in the form of a dome, a cone or a cylinder and covers at least the whole section of the chimney 90. The cap 91 is disposed with respect to the chimney such that the lower end of the cap 91 is lower than the upper end of the chimney 90 so that grains of catalyst are prevented from passing through the chimney 90. As an example, the upper end of the chimney 90 extends beyond the lower end of the cap 91 by at least a height h. In addition, the cap 91 may reach the plate 81, with orifices or notches then being cut out at the ends of the cap so as to allow gas to pass through.

Figure 4:
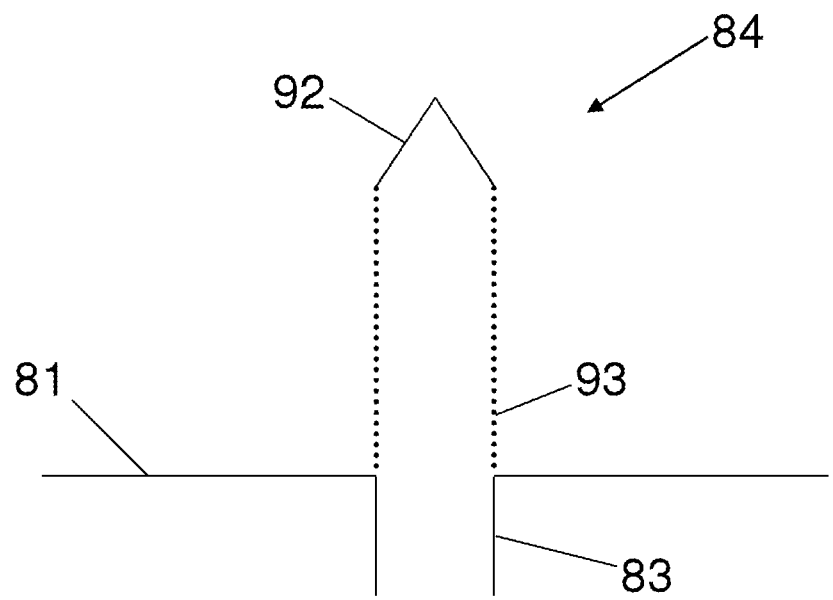
FIG. 4 shows a detail of an embodiment of a gas evacuating means of the chamber of the invention.

As an example, the gas injection means 84 shown in a diagrammatic manner in FIG. 4 may be employed. The reference numerals in FIG. 4 which are identical to those in FIG. 2 designate the same elements. Referring to FIG. 4, the gas injection means 84 is composed of a cylinder 93 formed as a screen, for example a Johnson screen, covered by a roof 92 of solid plate. The lower end of the cylinder 93 communicates with the gas passage means 83, while the upper end of the cylinder 93 is obstructed off by the plate 92 which forms a roof. The cylinder 93 extends along a vertical axis in order to encourage the flow of grains of catalyst along the screen and to prevent blocking and the deposition of chips, also known as fines, of catalyst against the screen. The roof 92 may be in the shape of a cone in order to deflect the flow of catalyst around the screen 84. As an example, the diameter of the cylinders 93 may be in the range 0.5" (12.7 mm) to 5" (127 mm), preferably in the range 0.5" (12.7 mm) to 3" (76.2 mm) and the height of the cylinders 84 may be in the range 50 to 400 mm, preferably in the range 80 to 250 mm.

The lines passing through the vessel 2 can be used to introduce the oxychlorination gas into the internal space 86 of the chamber 80. The line 73 may be arranged to open into the centre of the internal space 86 of the chamber 80. As an example, the line 73 may pass above, below or through the chamber 80. This configuration means that oxychlorination gas can be injected into the centre of the chamber 80 so that it can be distributed in a homogeneous manner throughout the internal space 86.

In accordance with another particular embodiment, the oxychlorination gas may also be injected at the wall of the vessel 2, directly into the space 86. Thus, the line 73 constitutes a side inlet for gas into the space 86, i.e. the line 73 may pass substantially horizontally through the vessel 2 in order to open into the space 86.

In accordance with another particular embodiment, a plurality of lines 73 may be used.

Referring now to FIG. 3, the end of the line 73 which opens into the space 86 is provided with a gas distributor 87 in order to diffuse the gas in all directions in the internal space 86. As an example, the distributor 87 may be a vertical cylinder which extends from the plate 82 to the plate 81, the cylinder comprising orifices or windows to diffuse the gas from the line 73 into the internal space 86. The distributor 87 may also have a dimension which is smaller than the distance H. Any type of distributor may be used without departing from the scope of the invention.

Alternatively, the oxychlorination gas may leave the line 73 directly when it enters the space 86, without necessarily passing through a distributor.

Figure 5:
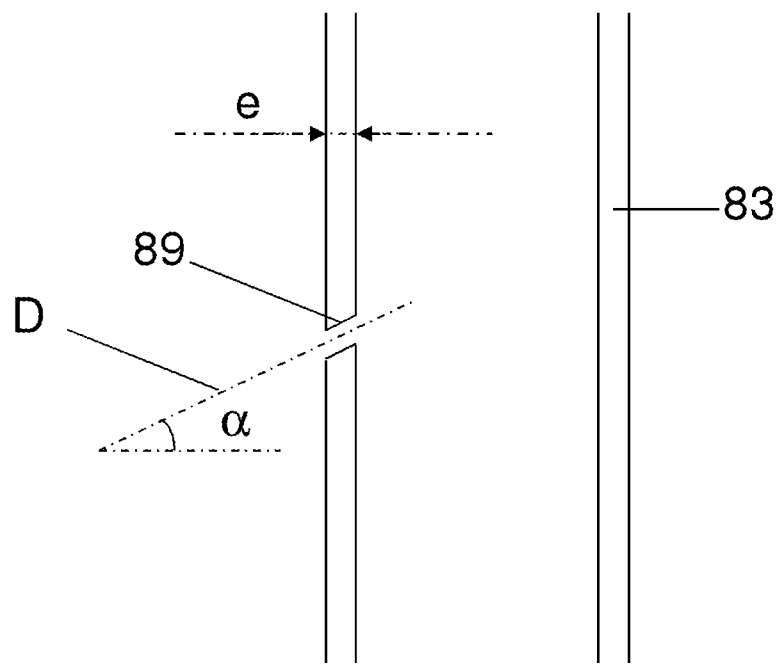
FIG. 5 represents a detail of a chamber of the invention.

In addition, referring to FIG. 2, each of the gas passage means 83 comprises one or more orifices 89, preferably in the range 1 to 10, or even in the range 1 to 5 orifices. The orifice or orifices 89 establish a communication between the internal space 86 of the chamber 80 and the mixing space 88 located inside the gas passage means 83. Thus, the oxychlorination gas injected into the internal space 86 via the line 73 flows in the mixing space 88 of each of the gas passage means 83, thereby being mixed with calcining gas moving in the gas passage means 83. The gas mixture obtained thereby is evacuated via the gas evacuation means 84. The pressure of the oxychlorination gas in the internal space 86 may be determined in order to ensure mixing between the oxychlorination gas and the calcining gas in the mixing space 88. Preferably, the pressure in the internal space 86 is higher than the pressure in the mixing space 88 in order to prevent the calcining gas moving in the gas passage means 83 from entering the internal space 86 of the chamber. As an example, the surface of the orifices may be in the range 7 mm$^2$ to 320 mm$^2$, which in the case of circular orifices corresponds to circular holes with a diameter in the range 3 mm to 20 mm. FIG. 5 shows a detail of a gas passage means 83 formed from a tube with a thickness e and comprising an orifice 89. In order to improve gas mixing, the orifices 89 may be pierced through the wall of the gas passage means 83 in a direction D which is directed upwardly and which forms an angle $\alpha$ in the range 0° to 80° with respect to the horizontal, preferably in the range 0° to 60°, or even in the range 10° to 60°. Further, in order to homogenize the flow rate of the gas moving through each of the orifices 89, each of the orifices 89 may be disposed on a portion of the gas passage means located opposite the position where the line 73 opens into the internal space 86.

The operation of the mixing zone of the invention is described with reference to FIG. 2. In FIG. 2, the space occupied by the catalyst is represented by hatching. The grains of catalyst flow from the space 72 to the space 75 via the tubes 85 in the direction of the arrows 95. The calcining gas moving in the space 75 is channelled in the direction of the arrows 96 via the gas passage means 83 in order to pass from the space 75 to the space 72. The oxychlorination gas is injected into the internal space 86 of the chamber 80 via the line 73. The oxychlorination gas flows from the internal space 86 into the mixing space 88 of the gas passage means 83 in the direction of the arrows 98. Thus, the calcining gas moving as an ascending current in the means 83 is mixed with oxychlorination gas injected via the orifices 89 in the mixing space 88. The gas mixture is evacuated via the gas evacuation means 84 in the direction of the arrows with reference numerals 97.

The simplicity of the chamber 80 and the reduced dimensions of the chamber 80, in particular the low bulk heightwise compared with the size of the reactor, means that the mixing zone of the invention can be used in the context of remodelling, commonly called "revamping", a facility. In fact, the chamber 80 provided with an injection line 73 may be installed in place of another system in an existing reactor, for example a reactor as described in document U.S. Pat. No. 7,985,381.

Thus, the chamber 80 can be used to produce homogeneous mixing between the calcining gas and the oxychlorination gas and the plurality of gas evacuation means 84 distributed over the section of the reactor means that this gas mixture can be distributed in a homogeneous manner over the whole section of the oxychlorination zone.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A reactor (1) for continuously regenerating grains of catalyst, said reactor comprising:
   a vessel (2) comprising an oxychlorination zone (72) superimposed over a calcining zone (75), said calcining zone being provided with a calcining gas introduction line, and a chamber (80) disposed between said oxychlorination zone and said calcining zone,
   said chamber (80) comprising an internal space (86) located between two plates (81; 82) which are gas tight and impervious to grains of catalyst, a plurality of tubes (85) passing through said chamber (80) to allow grains of catalyst to pass from said oxychlorination zone (72) to said calcining zone (75), a plurality of gas passage means (83) passing through said chamber (80) to allow calcining gas to pass from said calcining zone to said oxychlorination zone, said reactor (1) further comprising at least one oxychlorination gas injection line (73) opening into said internal space (86) of said chamber (80), wherein each of said gas passage means (83) comprises at least one orifice (89) communicating with said internal space (86) of said chamber (80), and each of said gas passage means (83) further comprising a gas evacuation means (84) for evacuating gas into said oxychlorination zone, said gas evacuation means (84) being permeable to gas and impermeable to grains of catalyst.

2. A reactor according to claim 1, wherein each of said gas evacuation means is a bubble cap, a perforated plate, or a screen.

3. A reactor according to claim 2, wherein each of said gas evacuation means is composed of a vertical tubular screen having a lower end and an upper end, the lower end of the vertical tubular screen communicating with a mixing zone within said gas passage means, and the upper end of the vertical tubular screen being obstructed by a roof.

4. A reactor according to claim 3, wherein said roof is a cone the peak of which is directed upwardly.

5. A reactor according to claim 1, wherein said oxychlorination gas injection line opens into the center of said internal space of said chamber.

6. A reactor according to claim 1, wherein said oxychlorination gas injection line opens into said internal space of said chamber at the wall of said vessel.

7. A reactor according to claim 1, wherein said at least one orifice (89) is oriented in an upward direction, forming an angle in the range 0° to 80° with respect to a horizontal direction.

8. A reactor according to claim 1, wherein at least a portion of said tubes and said gas passage means (83) are integral with said two plates.

9. A process for catalytic reforming of a hydrocarbon feed, in a reactor according to claim 1, wherein:
- a stream of grains of catalyst is introduced at the head of said oxychlorination zone;
- a stream of calcining gas is introduced via said calcining gas introduction line;
- a stream of oxychlorination gas is introduced via said oxychlorination gas injection line;
- a stream of gas is evacuated from a head of said oxychlorination zone;
- a stream of grains of catalyst is evacuated from a bottom of said calcining zone.

10. The process according to claim 9, wherein the grains of catalyst comprise platinum deposited on a porous support, the stream of calcining gas comprises air or oxygen-depleted air and is at a temperature in the range 400° C. to 550° C., and the stream of oxychlorination gas comprises a chlorine-containing compound and is at a temperature in the range 350° C. to 550° C.

11. A process for obtaining a reactor according to claim 1, in which an existing reactor is remodeled by replacing a prior oxychlorination gas injection system with said chamber.

12. A reactor according to claim 1, wherein said at least one orifice (89) is oriented in an upward direction, forming an angle in the range 0° to 60° with respect to a horizontal direction.

13. A reactor according to claim 1, further comprising a combustion zone in said vessel positioned above said oxychlorination zone (72).

14. A reactor according to claim 1, wherein each of said gas passage means (83) is a gas passage tube having an upper end and a lower end, the lower end of the gas passage tube is in fluid communication with said calcining zone, and the upper end of the gas passage tube extending above the upper of said two plates forming said chamber and being in fluid communication with said oxychlorination zone (72) via said gas evacuation means (84).

15. A reactor according to claim 14, wherein each of said gas evacuation means is a bubble cap, a perforated plate, or a screen.

16. A reactor according to claim 15, wherein each of said gas evacuation means is composed of a vertical tubular screen having a lower end and an upper end, the lower end of the vertical tubular screen communicating with a mixing zone within said gas passage means, and the upper end of the vertical tubular screen being obstructed by a roof.

17. A reactor according to claim 16, wherein said roof is a cone the peak of which is directed upwardly.

* * * * *